(12) United States Patent
Kang et al.

(10) Patent No.: US 9,218,050 B2
(45) Date of Patent: Dec. 22, 2015

(54) METHOD AND DEVICE FOR TRANSMITTING/RECEIVING IMAGE DATA AT HIGH SPEED

(75) Inventors: Min-Gu Kang, Daejeon-si (KR); Ja-Chul Ku, Daejeon-si (KR); Sang-Yoon Lee, Daejeon-si (KR); Ssang-Gun Lim, Daejeon-si (KR)

(73) Assignee: INTEKPLUS CO., LTD., Daejeon-si (KR)

(*) Notice: Subject to any disclaimer, the term of this patent is extended or adjusted under 35 U.S.C. 154(b) by 286 days.

(21) Appl. No.: 13/824,713

(22) PCT Filed: Sep. 28, 2011

(86) PCT No.: PCT/KR2011/007141
§ 371 (c)(1),
(2), (4) Date: Mar. 18, 2013

(87) PCT Pub. No.: WO2012/044061
PCT Pub. Date: Apr. 5, 2012

(65) Prior Publication Data
US 2013/0176443 A1 Jul. 11, 2013

(30) Foreign Application Priority Data
Sep. 29, 2010 (KR) .................. 10-2010-0094734

(51) Int. Cl.
*G06F 3/00* (2006.01)
*G06T 1/60* (2006.01)
*H04N 5/765* (2006.01)

(52) U.S. Cl.
CPC . *G06F 3/005* (2013.01); *G06T 1/60* (2013.01); *H04N 5/765* (2013.01)

(58) Field of Classification Search
CPC .......................................................... G06T 1/60
See application file for complete search history.

(56) References Cited

U.S. PATENT DOCUMENTS

| 7,126,839 B2* | 10/2006 | Kang .............................. 365/145 |
| 7,884,871 B2 | 2/2011 | Smith et al. |
| 2003/0222860 A1 | 12/2003 | Yamamura |

(Continued)

FOREIGN PATENT DOCUMENTS

| CN | 101715644 A | 5/2010 |
| EP | 1 014 706 A2 | 6/2000 |

(Continued)

OTHER PUBLICATIONS

Extended European Search Report issued on Mar. 13, 2014 in the European Intellectual Patent office in the related Patent Application EP 11829567.4.

(Continued)

*Primary Examiner* — Kee M Tung
*Assistant Examiner* — Grace Q Li
(74) *Attorney, Agent, or Firm* — NSIP Law

(57) ABSTRACT

Provided are a method of transmitting and receiving image data with high speed, which includes sequentially transmitting image data output from an image sensor through one or more transmission channels with a speed corresponding to a bandwidth of the transmission channels, and sequentially recording image data received through one or more transmission channels in a frame store with a speed corresponding to a total bandwidth obtained by summing bandwidths of the respective one or more transmission channels, and an apparatus for implementing the method.

11 Claims, 10 Drawing Sheets

(56) References Cited

U.S. PATENT DOCUMENTS

| | | |
|---|---|---|
| 2005/0008230 A1* | 1/2005 | Sasaki .......................... 382/232 |
| 2006/0023794 A1* | 2/2006 | Wan et al. ................ 375/240.29 |
| 2006/0140498 A1* | 6/2006 | Kudo et al. ................... 382/254 |
| 2008/0298806 A1* | 12/2008 | Effenberger .................... 398/75 |
| 2009/0244080 A1* | 10/2009 | Ishikura ........................ 345/560 |
| 2010/0017544 A1* | 1/2010 | Chun et al. ..................... 710/22 |
| 2010/0188569 A1* | 7/2010 | Meiners et al. ............... 348/441 |
| 2010/0201825 A1* | 8/2010 | Huang ...................... 348/207.1 |

FOREIGN PATENT DOCUMENTS

| | | |
|---|---|---|
| EP | 1 223 549 A1 | 7/2002 |
| EP | 2 037 673 A1 | 6/2007 |
| JP | 2007-135070 A | 5/2007 |
| JP | 2007-195106 A | 8/2007 |
| KR | 10-0473719 B1 | 2/2004 |
| KR | 10-2008-0098119 A | 11/2008 |
| WO | WO 97/48056 A1 | 12/1997 |

OTHER PUBLICATIONS

International Search Report issued Mar. 20, 2012, in counterpart International Patent Application No. PCT/KR2011/007141, (5 pages including English translation).

\* cited by examiner

METHOD AND DEVICE FOR TRANSMITTING/RECEIVING IMAGE DATA AT HIGH SPEED

CROSS-REFERENCE TO RELATED APPLICATIONS

The present application claims the benefit of International Application No. PCT/KR2011/007141, filed on Sep. 28, 2011, which claims priority from Korean Patent Application No. 10-2010-0094734, filed on Sep. 29, 2010.

BACKGROUND

1. Technical Field

The present invention relates to a method and apparatus for transmitting/receiving image data with high speed, and more particularly, to a method and apparatus for transmitting and receiving image data between a camera and an image data processing apparatus.

2. Background Art

Of late, the possibility of growth in the field of digital image processing is further increasing. Photographing apparatuses, such as a digital still camera (DSC) and an image recorder, convert images into digital signals and store the digital signals. A digital image transmitted from such a photographing apparatus to an image signal processing apparatus, such as a personnel computer (PC), is processed using several algorithms.

FIG. 1 shows a constitution of a general image data transceiver system.

A camera 10 is configured to be connected with a frame grabber 20. The camera 10 and the frame grabber 20 are connected through a cable 30. Here, the camera 10 and the frame grabber 20 perform data transmission and reception via an interface that conforms to the camera link standard.

In such a constitution, the camera 10 transmits taken image data to the frame grabber 20 through the cable 30. As a processing board that receives and processes the image data transmitted from the camera, the frame grabber 20 is connected with a main system via the peripheral component interconnect (PCI) bus so as to be used in a general PC environment.

SUMMARY

1. Technical Problem

The present invention is directed to a method and apparatus for transmitting and receiving image data taken by a camera to and from an image data processing apparatus with high speed.

2. Technical Solution

One aspect of the present invention provides an apparatus for transmitting image data with high speed, including: a buffer recording controller configured to sequentially record image data output from an image sensor in one or more line buffers (LBs); and a transmission controller configured to sequentially read the image data stored in the one or more buffers, and control the image data to be sequentially output to one or more transmission channels with a recording speed corresponding to a bandwidth of the transmission channels.

Another aspect of the present invention provides an apparatus for receiving image data with high speed, including: a reception controller configured to control image data received through one or more transmission channels to be sequentially recorded in one or more LBs; and a buffer reading controller configured to read the image data stored in the one or more LBs with a speed corresponding to a total bandwidth obtained by summing bandwidths of the respective one or more transmission channels, and sequentially record the image data in a frame store.

Still another aspect of the present invention provides a method of transmitting and receiving image data with high speed, including: sequentially transmitting image data output from an image sensor through one or more transmission channels with a speed corresponding to a bandwidth of the transmission channels; and sequentially recording image data received through one or more transmission channels in a frame store with a speed corresponding to a total bandwidth obtained by summing bandwidths of the respective one or more transmission channels.

Yet another aspect of the present invention provides a method of transmitting image data with high speed, including: sequentially storing image data output from an image sensor according to lines; and sequentially outputting the stored image data to one or more transmission channels with a recording speed corresponding to a bandwidth of the transmission channels.

Yet another aspect of the present invention provides a method of receiving image data with high speed, including: sequentially storing image data received through one or more transmission channels according to lines; and reading the stored image data with a speed corresponding to a total bandwidth obtained by summing bandwidths of the respective one or more transmission channels, and sequentially recording the image data in a frame store.

3. Advantageous Effects

The present invention transmits image data output with high speed from an image sensor through a coaxial cable having a plurality of transmission channels, and thus can transmit the image data with high speed.

The present invention receives image data transmitted through a coaxial cable having a plurality of transmission channels, and thus can receive the image data with high speed.

DETAILED DESCRIPTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

In describing the present invention, when it is determined that a detailed description of well-known function or constitution relating to the present invention may unnecessarily make unclear the spirit of the present invention, the detailed description thereof will be omitted.

The following terminologies are defined in consideration of the functions in the present invention and may be construed in different ways by the intention, custom, etc. of users or operators. Therefore, the definitions thereof should be construed based on the contents throughout the specification.

The present invention proposes a method of transmitting and receiving image data with high speed, including a step of sequentially transmitting image data output from an image sensor through one or more transmission channels with a speed corresponding to a bandwidth of the transmission channels, and a step of sequentially recording image data received through one or more transmission channels in a frame store with a speed corresponding to a total bandwidth obtained by summing bandwidths of the respective one or more transmission channels.

Also, the present invention proposes a method of transmitting image data with high speed, including a step of sequentially storing image data output from an image sensor according to lines, and a step of sequentially outputting the stored image data to one or more transmission channels with a recording speed corresponding to a bandwidth of the transmission channels.

Further, the present invention proposes a method of receiving image data with high speed, including a step of sequentially storing image data received through one or more transmission channels according to lines, and a step of reading the stored image data with a speed corresponding to a total bandwidth obtained by summing bandwidths of the respective one or more transmission channels, and sequentially recording the image data in a frame store.

Figure 1:
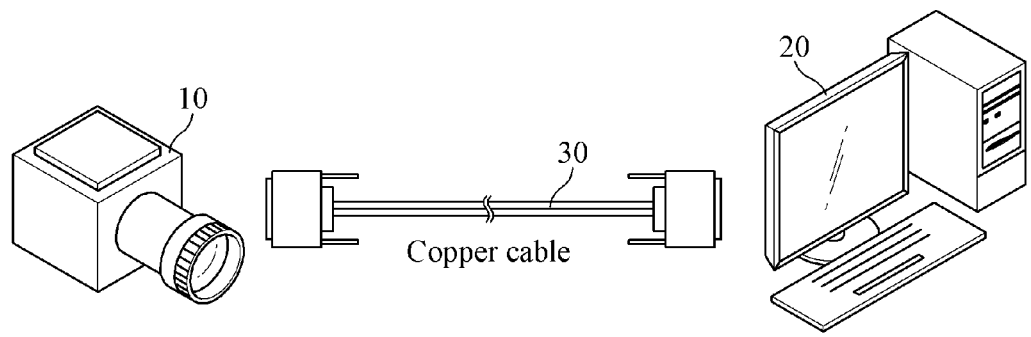
FIG. 1 shows a constitution of a general image data transceiver system.
Figure 2:
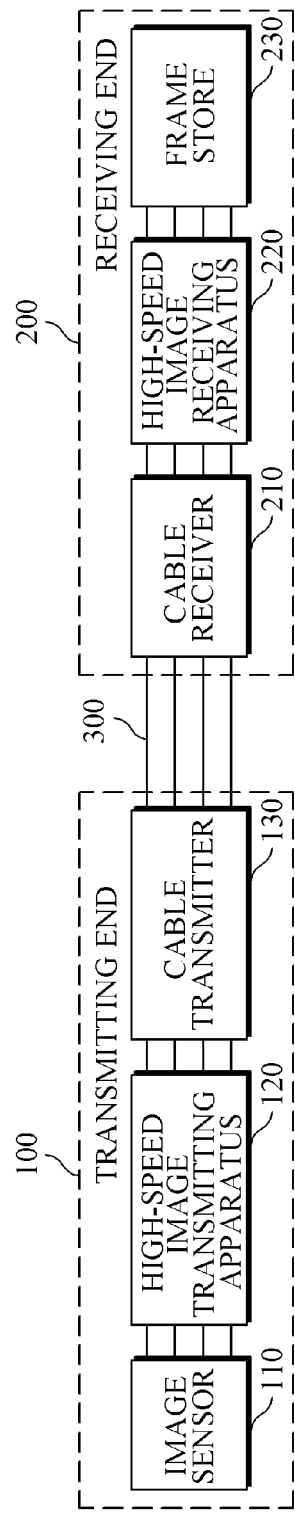
FIG. 2 is a diagram showing a constitution of a system for transmitting and receiving image data with high speed according to an exemplary embodiment of the present invention.

A constitution of a system including an apparatus for implementing the foregoing method of transmitting and receiving image data with high speed is shown in FIG. 2 described below.

FIG. 2 is a diagram showing a constitution of a system for transmitting and receiving image data with high speed according to an exemplary embodiment of the present invention.

In a system for transmitting and receiving image data with high speed according to an exemplary embodiment of the present invention, image data is transmitted and received in parallel using a coaxial cable 300 having a plurality of transmission channels as a data transmission medium of a transmitting end 100 and a receiving end 200.

In detail, the transmitting end 100 includes an image sensor (I/S) 110 that is an imaging device of a photographing apparatus, a high-speed image transmitting apparatus 120 that controls image data output from the image sensor 110 to be sequentially output with a speed corresponding to the bandwidth of a transmission channel of the coaxial cable 300, and a cable transmitter 130 that controls the transmission channel of the coaxial cable 300 to be driven so that the image data output from the high-speed image transmitting apparatus 120 can be transmitted.

In detail, the receiving end 200 includes a cable receiver 210 that converts a signal received from the coaxial cable 300 into a digitally processable signal and outputs the digitally processable signal, and a high-speed image receiving apparatus 220 that sequentially receives the digitally processable signal from the cable receiver 210 with a speed corresponding to the bandwidth of the transmission channel of the coaxial cable 300, and controls the digitally processable signal to be recorded in a frame store 280 with high speed.

The constitution of a transmitting end including an apparatus for transmitting image data with high speed according to an exemplary embodiment of the present invention will be described in further detail below with reference to FIG. 3.

The image sensor 110 is a photographing device in which M×N unit pixels (M and N are natural numbers) fabricated to maximize a characteristic of reacting to light, are arranged to output an electric signal (raw data; for convenience, referred to as "image data" below) corresponding to pixel-specific light quantities input through a lens of the photographing apparatus, such as a camera. As the image sensor 110, a solid imaging device such as a charge-coupled device (CCD) image sensor or a complementary metal oxide semiconductor (CMOS) image sensor can be generally used, and the image sensor 110 can take an image of a subject at a mega-pixel level of about 800,000 pixels to 1,500,000 pixels to generate high-resolution image data having a resolution of 1440*960. Also, the image sensor 110 can output M-line-specific image data through one or more output taps in serial or parallel.

The cable transmitter 130 is a coaxial cable driver that processes image data to be transmitted through the plurality of transmission channels of the coaxial cable 300, and may be plural in number to correspond to the plurality of transmission channels, respectively.

The high-speed image transmitting apparatus 120 controls image data output from the image sensor 110 to be output with a speed corresponding to the bandwidth of a transmission channel of the coaxial cable 300. In other words, since the output speed of the image sensor 110 is greater than the speed corresponding to the bandwidth of the transmission channel, the high-speed image transmitting apparatus 120 adjusts the output speed of the image data and outputs the image data.

Figure 3:
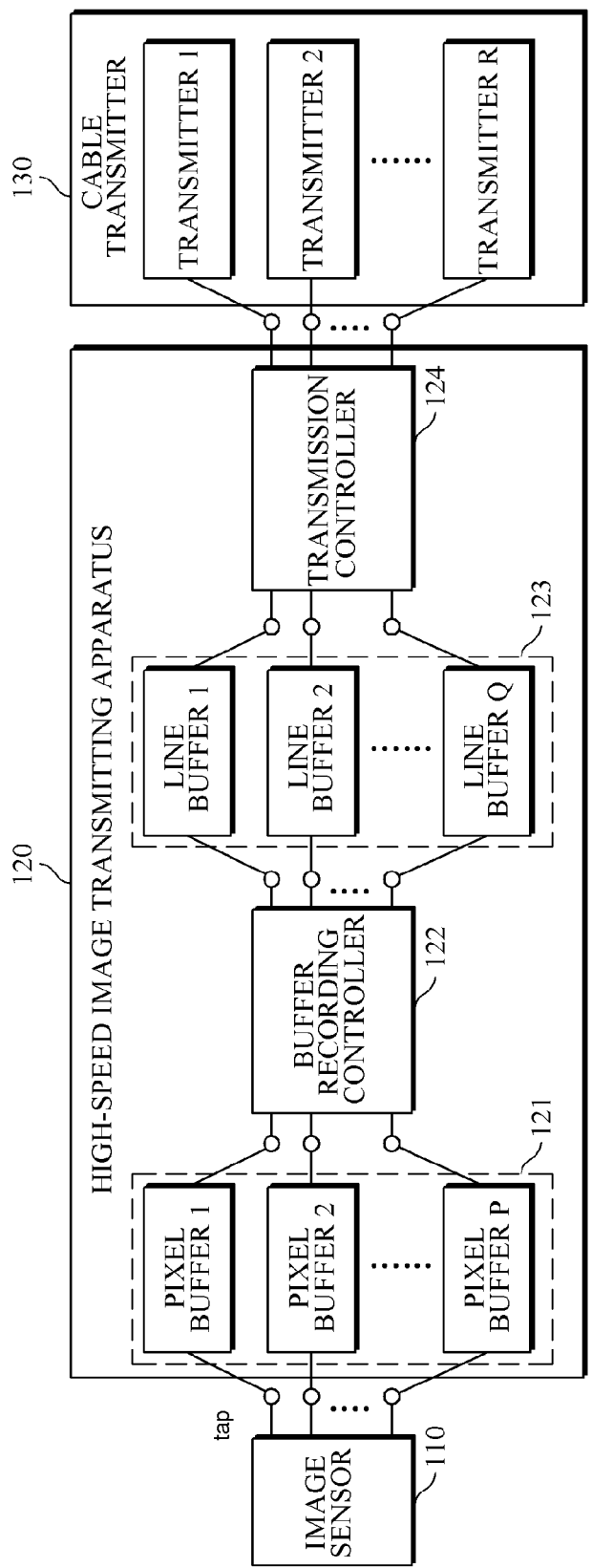
FIG. 3 is a diagram showing a constitution of a transmitting end including an apparatus for transmitting image data with high speed according to an exemplary embodiment of the present invention.

To this end, the high-speed image transmitting apparatus 120 according to an exemplary embodiment of the present invention includes, as shown in FIG. 3, one or more line buffers (LBs) 123 that are line memories, a buffer recording controller 122 that sequentially records image data output through the one or more output taps of the image sensor 110 in the LBs 123, and a transmission controller 124 that reads image data recorded in the LBs 123 and outputs the image data to be transmitted through the cable transmitter 130, and may be implemented using a field programmable gate array (FPGA).

Also, according to an exemplary embodiment of the present invention, the high-speed image transmitting apparatus 120 further includes a pixel buffer 121 that is connected to one or more output taps of the image sensor 110 and temporarily stores image data. The pixel buffer 121 serves as a first input first output (FIFO) that outputs data at predetermined periods in synchronization with an output clock of the image sensor 110, and may be several line memories. Here, the buffer recording controller 122 reads the image data from the pixel buffer 121.

Figure 4:
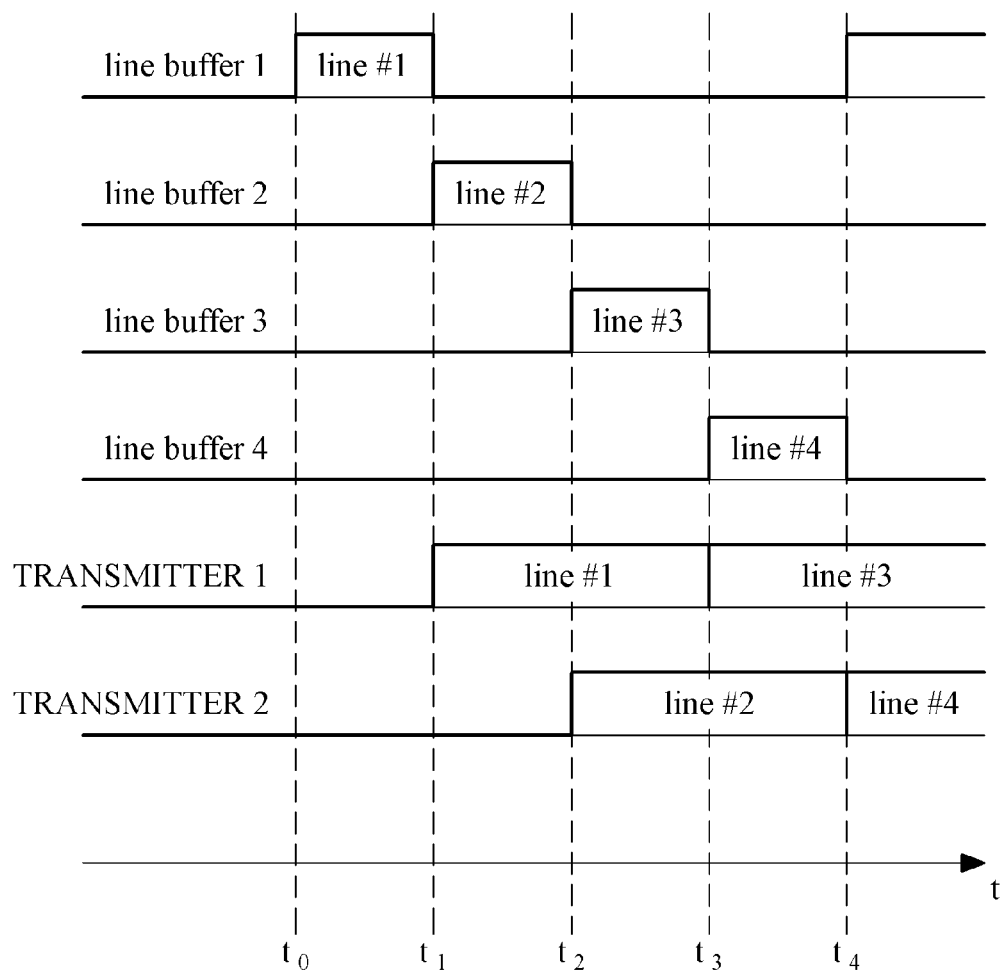
FIG. 4 is a diagram showing an example of a signal according to operation of an apparatus for transmitting image data with high speed.
Figure 5:
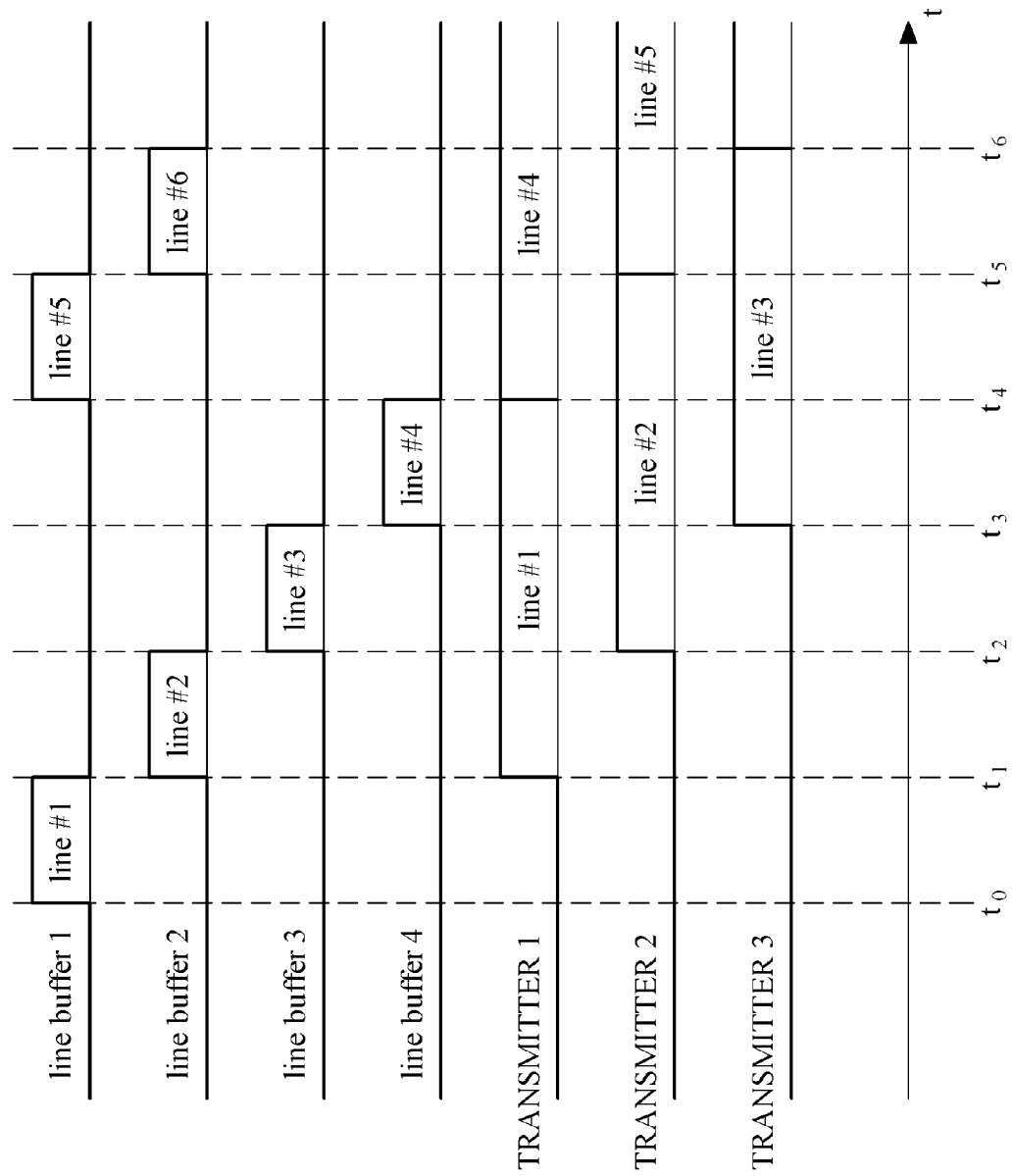
FIG. 5 is a diagram showing another example of a signal according to operation of an apparatus for transmitting image data with high speed.

FIGS. 4 and 5 are diagrams showing an example of a signal according to operation of an apparatus for transmitting image data with high speed. FIG. 4 illustrates a case in which a speed corresponding to the bandwidth of a transmission channel is half the output speed of an image sensor, and FIG. 5 illustrates a case in which a speed corresponding to the bandwidth of the channel is one third of the output speed of the image sensor.

Referring to FIGS. 4 and 5, operation of the buffer recording controller 122 and the transmission controller 124 will be described.

As image data is output from the image sensor 110 according to lines, the buffer recording controller 122 sequentially records the image data in write-enabled LBs 123 with a speed corresponding to the output speed of the image sensor 110.

Referring to FIG. 4, the buffer recording controller 122 starts to record image data in an LB at a time point $t_0$. At time point $t_1$, the memory space of LB 1 is filled up and write-disabled, and the buffer recording controller 122 starts to record image data in LB 2. In this way, the buffer recording controller 122 sequentially performs a write operation on the LBs 123.

Meanwhile, while the buffer recording controller 122 performs recording in the LBs 123, the transmission controller 124 reads image data recorded in a full LB and controls the read image data to be transmitted through the cable transmitter 130 with a transmission speed corresponding to the bandwidth of a transmission channel.

Referring to FIG. 4, at time point $t_1$, LB 1 is filled up and read-enabled, and the transmission controller 124 reads the image data recorded in LB 1 and outputs the image data through transmitter 1. At this time, since a transmission speed corresponding to the bandwidth of a transmission channel is half the output speed of the image sensor 110 in the example shown in FIG. 4, the transmission controller 124 performs a read operation during a time period from $t_1$ to $t_3$ and controls the read data to be output to transmitter 1.

Meanwhile, at time point $t_2$, LB 2 is read-enabled, and the transmission controller 124 transmits the data recorded in LB 2 to transmitter 2. In other words, a bandwidth doubles using two transmission channels, and accords with the output speed of the image sensor 110.

As an extended description with reference to FIG. 5, the output speed of the image sensor 110 is three times a transmission speed corresponding to the bandwidth of a transmission channel of a coaxial cable, and a bandwidth triples using three transmission channels.

For speed adjustment as described above, the number of the LBs 123 may be greater than the number of the transmission channels.

Also, when image data is transmitted from the transmission controller 124 to the transmitter 130, the transmission controller 124 may add header information for identifying lines of the image data output from the image sensor 110 according to the lines to the image data output from the LBs 123.

For example, referring to FIG. 4, when the transmission controller 124 outputs line #1 image data read from LB 1 to transmitter 1 at the time point $t_1$, header information for identifying line #1 is added to the image data, and the image data is output to transmitter 1. Such header information is used for aligning image data in the receiving end 200.

Meanwhile, the image sensor 110 according to the present invention can output line-specific image data through one or more output taps in serial or parallel. When the line-specific image data is output in parallel, the buffer recording controller 122 and the transmission controller 124 of the high-speed image transmitting apparatus 120 may be plural in number according to another exemplary embodiment of the present invention.

Here, an LB is a multiport memory having a plurality of write and read ports, and the plurality of buffer recording controllers correspond to the plurality of write ports, respectively. Also, one or more output taps of the image sensor are divided into a plurality of groups, and the groups are allocated to the plurality of buffer recording controllers, respectively. Then, each of the plurality of buffer recording controllers records image data output from the allocated group of output taps in the corresponding write port.

The plurality of transmission controllers correspond to the write ports. The one or more transmission channels are divided into a plurality of groups, and the groups are allocated to the plurality of transmission controllers, respectively. Then, each of the plurality of transmission controllers reads image data from the corresponding read port and outputs the image data to the corresponding group of transmission channels.

Figure 6:
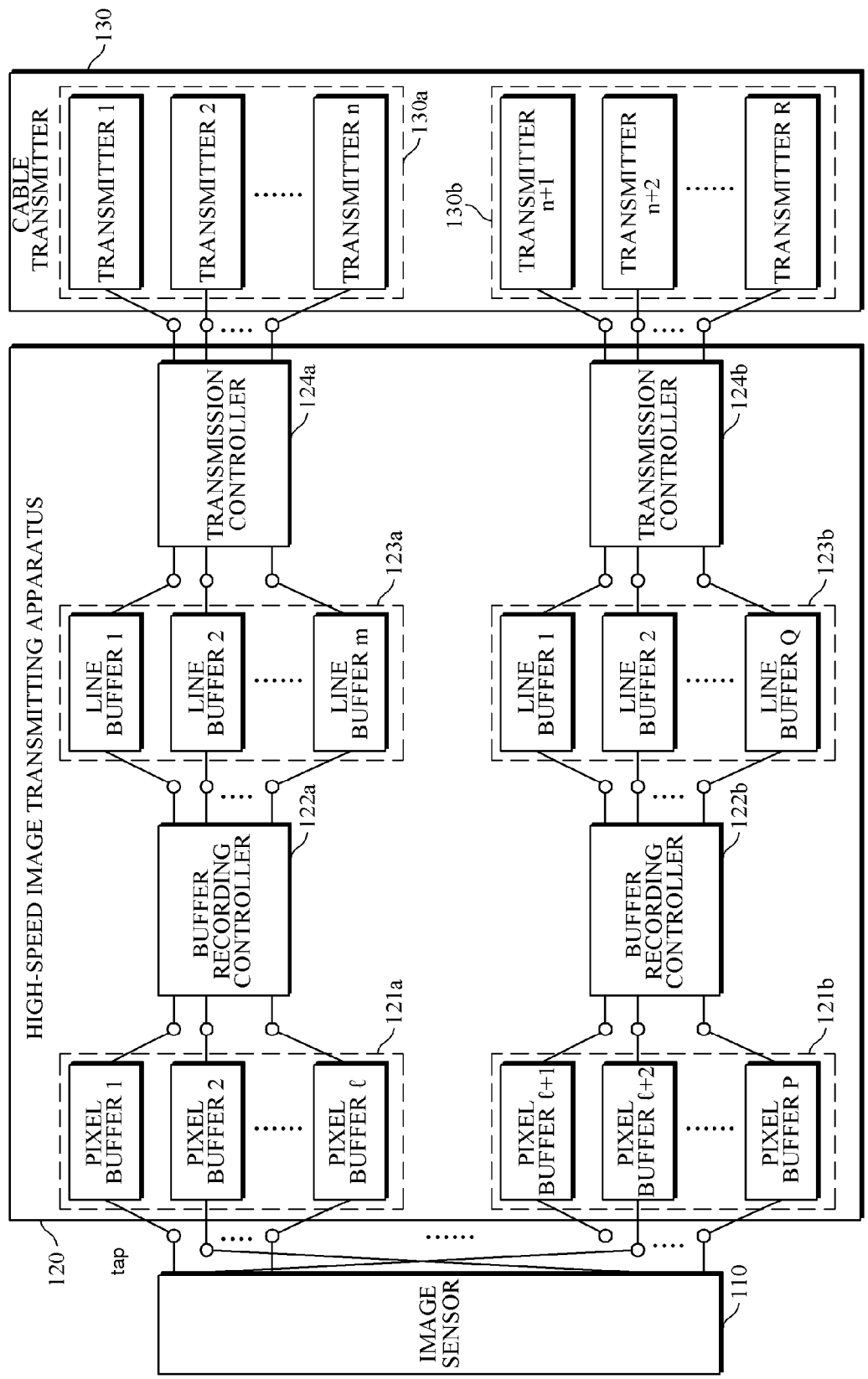
FIG. 6 is a diagram showing a constitution of a transmitting end including an apparatus for transmitting image data with high speed according to another exemplary embodiment of the present invention.

An example of the constitution of a transmitting end including the foregoing apparatus for transmitting image data with high speed according to another exemplary embodiment of the present invention is shown in FIG. 6.

Referring to FIG. 6, a plurality of buffer recording controllers 122a and 122b and a plurality of transmission controllers 124a and 124b are provided, and LBs 123a and 123b and cable transmitters 130a and 130b are separately managed.

Next, the constitution of a receiving end including an apparatus for receiving image data with high speed according to an exemplary embodiment of the present invention will be described in further detail below with reference to FIG. 7.

The cable receiver 210 is a coaxial cable driver that processes image data to be received through the plurality of transmission channels of the coaxial cable 300, and may be plural in number to correspond to the plurality of transmission channels, respectively.

The frame store 230 stores output image data of the image sensor 110 transmitted through the coaxial cable 300. Although not shown in the drawing, the image data stored in the frame store 230 is transferred to a personnel computer (PC) and image-processed.

The high-speed image receiving apparatus 220 controls image data received through the plurality of receivers 210 to be output to the frame store 230 with a speed corresponding to the bandwidth supported by the plurality of receivers 210. For example, the transmission bandwidth of one receiver 210 is 1/R of a transmission bandwidth supported by all of R receivers 210, and thus the high-speed image receiving apparatus 220 needs to record the image data in the frame store 230 with a speed R times faster than each of plurality of receivers 210.

Figure 7:
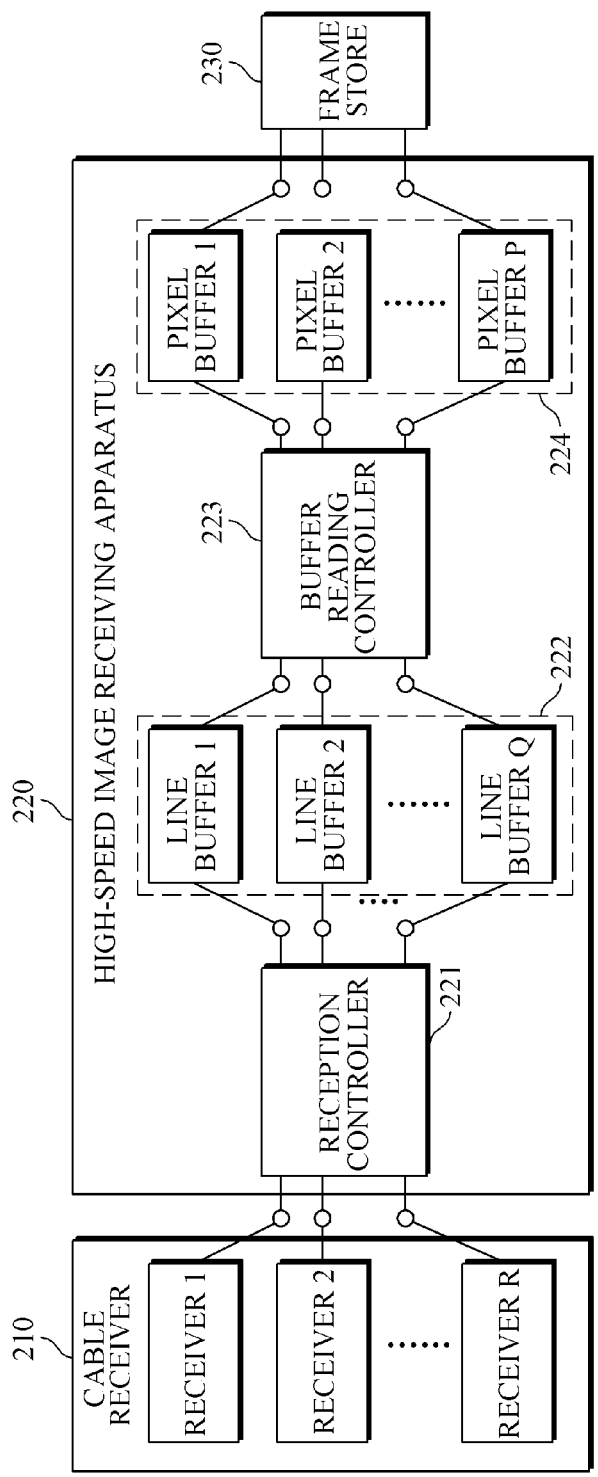
FIG. 7 is a diagram showing a constitution of a receiving end including an apparatus for receiving image data with high speed according to an exemplary embodiment of the present invention.

To this end, the high-speed image receiving apparatus 220 according to an exemplary embodiment of the present invention includes, as shown in FIG. 7, one or more LBs 222 that are line memories, a reception controller 221 that sequentially records image data transmitted through the one or more receivers 210 in the LBs 222, and a buffer reading controller 223 that reads the image data recorded in the LBs 222 and outputs the image data to the frame store 230, and may be implemented using an FPGA.

Also, according to an exemplary embodiment of the present invention, the high-speed image receiving apparatus 220 further includes a pixel buffer 224 that is connected to one or more output taps of the frame store 230 and temporarily stores image data.

Figure 8:
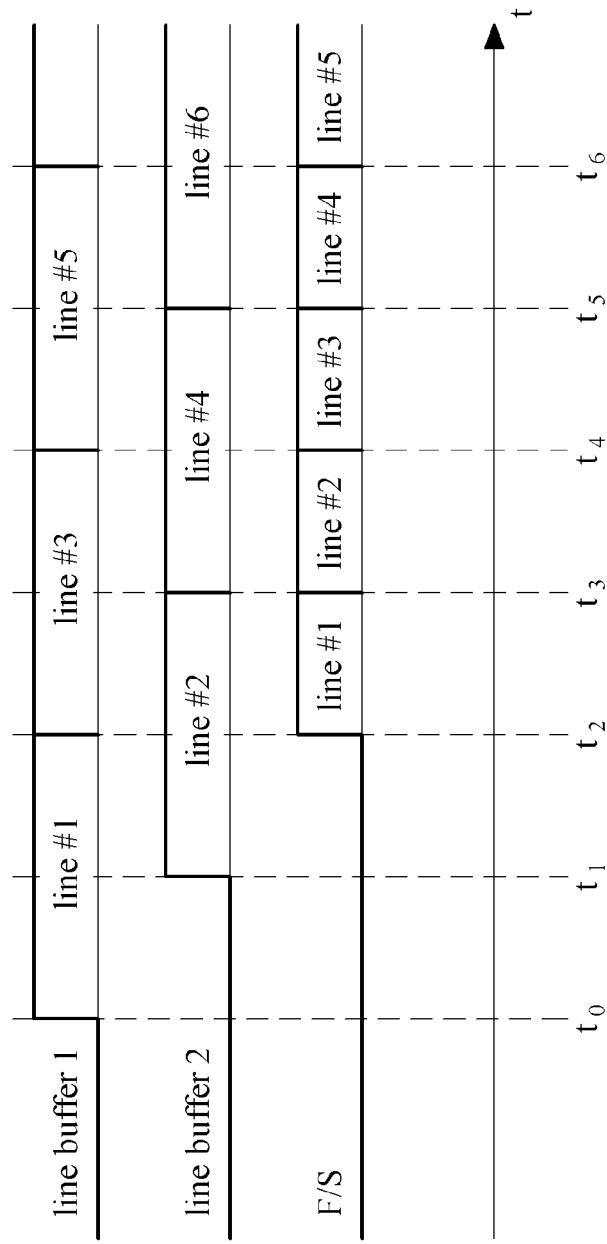
FIG. 8 is a diagram showing another example of a signal according to operation of an apparatus for transmitting image data with high speed
Figure 9:
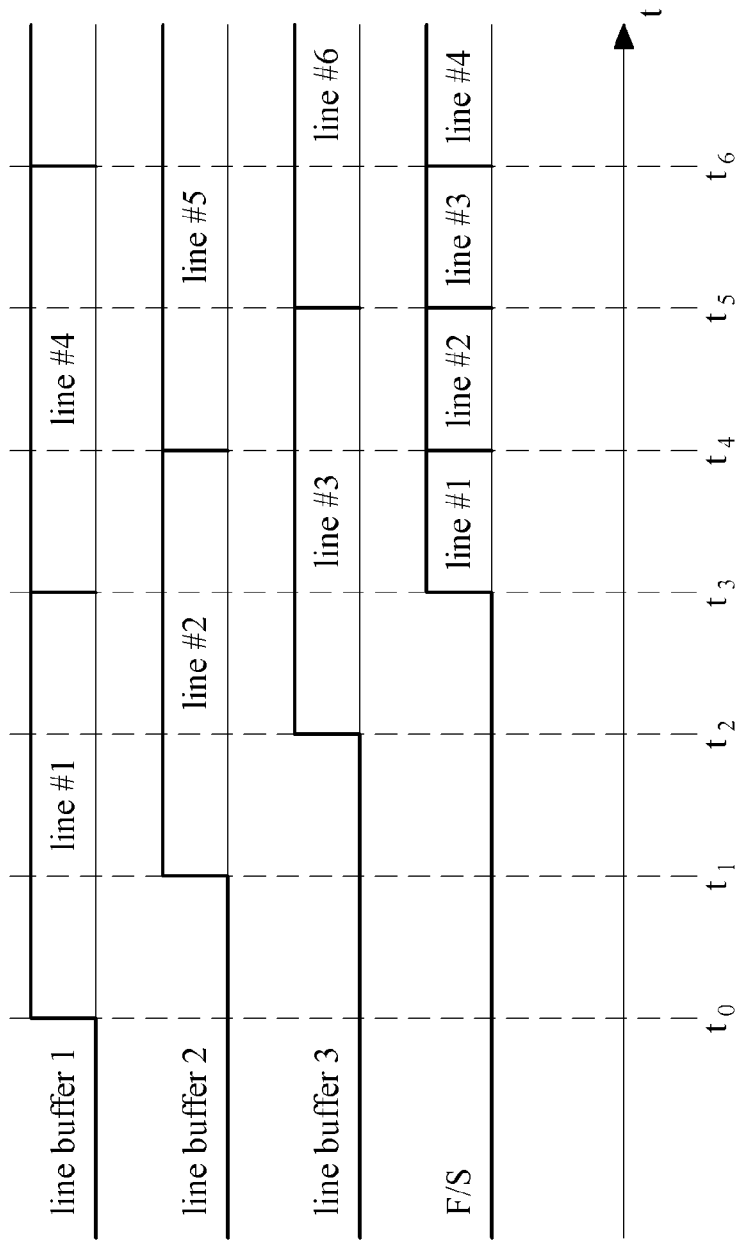
FIG. 9 is a diagram showing another example of a signal according to operation of an apparatus for receiving image data with high speed.

FIGS. 8 and 9 are diagrams showing an example of a signal according to operation of an apparatus for receiving image data with high speed. FIG. 8 illustrates a case in which image data is received through two transmission channels, and FIG. 9 illustrates a case in which image data is received through three transmission channels.

Referring to FIGS. 8 and 9, operation of the reception controller 221 and the buffer reading controller 223 will be described.

As image data is received from the plurality of receivers 210, the reception controller 221 sequentially records image data in write-enabled LBs 222 with a speed corresponding to the bandwidth of one receiver 210.

Referring to FIG. 8, at a time point $t_0$, the reception controller 221 starts to record image data received through receiver 1 in an LB 1. Also, at time point $t_1$, the reception controller 221 starts to record image data received through receiver 2 in an LB 2. At this time, since the reception controller 221 records with the speed corresponding to the bandwidth of the one receiver 210, the memory space of LB 1 is filled up and write-disabled at time point $t_2$.

Meanwhile, while the reception controller 221 records in the LBs 222, the buffer reading controller 223 reads image data recorded in a full LB with a speed corresponding to the sum of the bandwidths of the plurality of receivers 210, and controls the read image data to be transmitted to the frame store 230.

Referring to FIG. 8, at time point $t_2$, LB 1 is filled up and read-enabled, and the buffer reading controller 223 reads the image data recorded in LB 1 and outputs the image data. At this time, since a transmission speed corresponding to the total bandwidth of transmission channels is double the reception speed of one receiver in the example shown in FIG. 8, the buffer reading controller 223 performs a read operation during a time period from $t_2$ to $t_3$ and controls the read data to be output to the frame store 230.

Then, as LB 2 is read-enabled at time point $t_3$, the buffer reading controller 223 has finished the read operation of LB 1, thus reading the data recorded in LB 2 and controlling the data to be output to the frame store 230. In other words, since a bandwidth doubles using two transmission channels, the recording speed of the frame store 230 doubles.

As an extended description with reference to FIG. 9, the sum of the bandwidths of a plurality of transmission channels of a coaxial cable is triple the bandwidth of one transmission channel, and thus the recording speed of the frame store 230 triples to correspond to the bandwidths of three transmission channels.

For speed adjustment as described above, the number of the LBs 222 may be greater than the number of the transmission channels.

Meanwhile, according to another exemplary embodiment of the present invention, a reception controller and a buffer reading controller of a high-speed image receiving apparatus may be plural in number.

Here, an LB is a multiport memory having a plurality of write and read ports, and the plurality of reception controllers correspond to the plurality of write ports, respectively. Also, the one or more transmission channels are divided into a plurality of groups, and the groups are allocated to the plurality of reception controllers, respectively. Then, each of the plurality of reception controllers records image data output from the allocated group of transmission channels in the corresponding write port.

Also, the plurality of buffer reading controllers correspond to the plurality of write ports, respectively. One or more input taps of the frame store are divided into a plurality of groups, and the groups are allocated to the plurality of buffer recording controllers, respectively. Then, each of the plurality of buffer recording controllers reads image data from the corresponding read port and outputs the image data to an allocated group of input taps.

Figure 10:
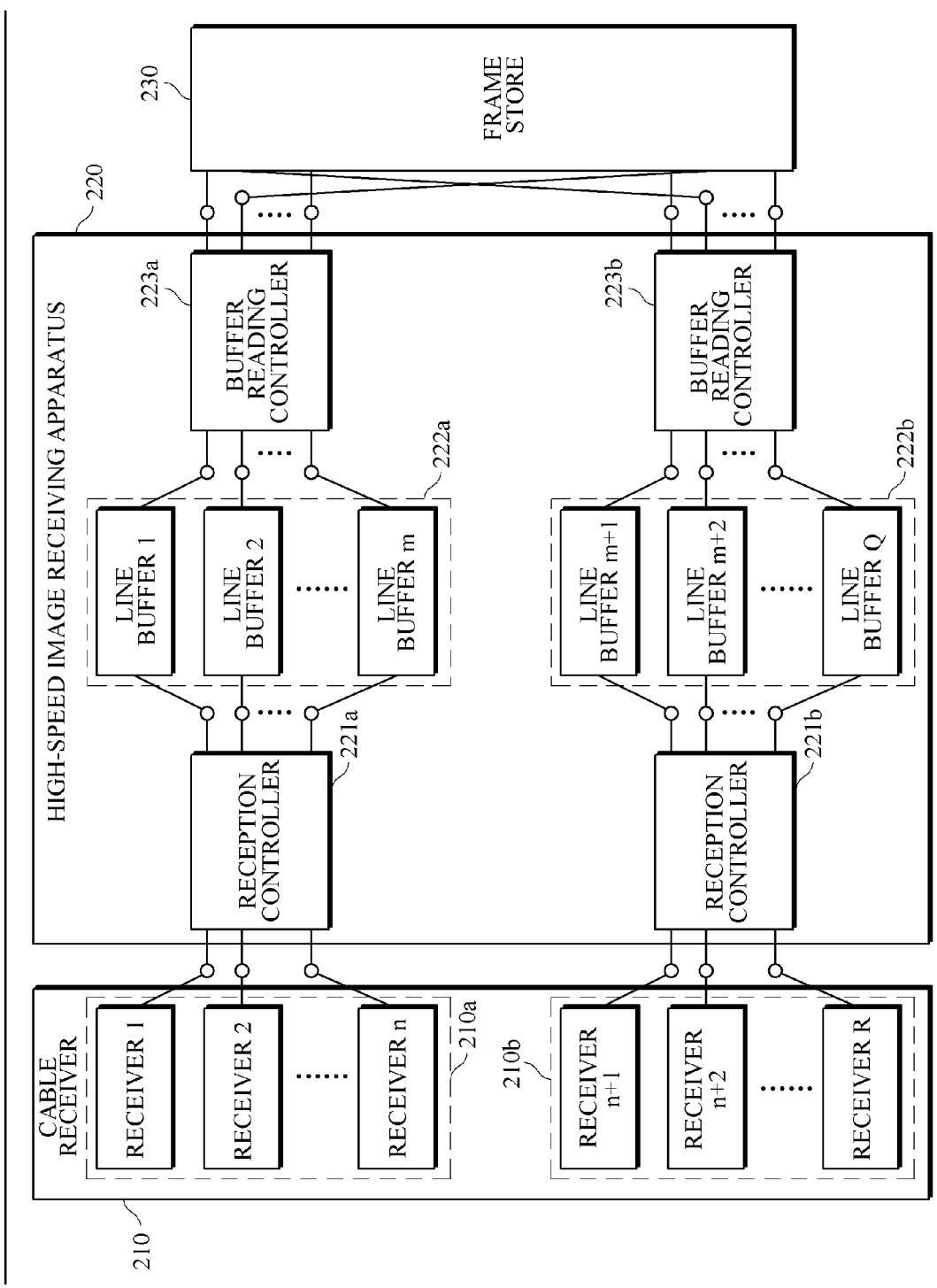
FIG. 10 is a diagram showing a constitution of a receiving end including an apparatus for transmitting image data with high speed according to another exemplary embodiment of the present invention.

An example of the constitution of a receiving end including the foregoing apparatus for receiving image data with high speed according to another exemplary embodiment of the present invention is shown in FIG. 10.

Referring to FIG. 10, a plurality of reception controllers 221a and 221b and a plurality of buffer reading controllers 223a and 223b are provided, and cable receivers 210a and 210b and LBs 222a and 222b are separately managed.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for transmitting image data with high speed, comprising:
    a pixel buffer configured to include several line memories connected to one or more output taps of an image sensor and temporarily store image data;
    one or more line buffers (LBs);
    a buffer recording controller configured to sequentially record image data output from the pixel buffer in the one or more LBs; and
    a transmission controller configured to sequentially read the image data stored in one line buffer among the one or more LBs while the buffer recording controller writes another line buffer among one or more LBs, and control the image data to be sequentially output to one or more transmission channels with a recording speed corresponding to a bandwidth of the transmission channels,
    wherein the LBs are multiport memories having a plurality of write ports,
    the buffer recording controller is plural in number to correspond to the write ports,
    one or more output taps of the image sensor are divided into a plurality of groups, and the groups are allocated to the plurality of buffer recording controllers, respectively, and
    the plurality of buffer recording controllers record the image data output from the allocated groups of output taps in the corresponding write ports, respectively.

2. The apparatus of claim 1, wherein the LBs are multiport memories having a plurality of read ports,
    the transmission controller is plural in number to correspond to the read ports,
    the one or more transmission channels are divided into a plurality of groups, and the groups are allocated to the plurality of transmission controllers, respectively, and the plurality of transmission controllers record the image data output from the corresponding read ports and output the image data to the allocated groups of transmission channels, respectively.

3. The apparatus of claim 1, further comprising a plurality of pixel buffers configured to temporarily store the image data output from a plurality of output taps of the image sensor,
wherein the buffer recording controller reads the image data from the pixel buffers.

4. The apparatus of claim 1, wherein the number of the LBs is equal to or greater than the number of the transmission channels.

5. The apparatus of claim 1, wherein the transmission controller adds line identification header information on the image data output from the image sensor according to lines to the image data, and outputs the image data to the transmission channels.

6. An apparatus for receiving image data with high speed, comprising:
a pixel buffer configured to include several line memories connected to a frame store and temporarily store image data;
one or more line buffers;
a reception controller configured to control image data received through one or more transmission channels to be sequentially recorded in one or more line buffers (LBs); and
a buffer reading controller configured to read, while the reception controller records in one line buffer among the one or more LBs, the image data stored in another line buffer among the one or more LBs with a speed corresponding to a total bandwidth obtained by summing bandwidths of the respective one or more transmission channels, and sequentially record the image data in the pixel buffer.

7. The apparatus of claim 6, wherein the LBs are multiport memories having a plurality of write ports,
the reception controller is plural in number to correspond to the write ports,
the one or more transmission channels are divided into a plurality of groups, and the groups are allocated to the plurality of reception controllers, respectively, and
the plurality of reception controllers record the image data output from the allocated groups of transmission channels in the corresponding write ports, respectively.

8. The apparatus of claim 6, wherein the LBs are multiport memories having a plurality of read ports,
the buffer reading controller is plural in number to correspond to the read ports,
one or more input taps of the frame store are divided into a plurality of groups, and the groups are allocated to the plurality of buffer reading controllers, respectively, and
the plurality of buffer reading controllers record the image data from the corresponding read ports and output the image data to the allocated groups of input taps, respectively.

9. The apparatus of claim 6, further comprising a plurality of pixel buffers configured to temporarily store the image data input from a plurality of input taps of the frame store,
wherein the buffer reading controller outputs the image data to the pixel buffers.

10. The apparatus of claim 6, wherein the number of the LBs is equal to or greater than the number of the transmission channels.

11. A method of receiving image data with high speed, comprising:
sequentially storing image data received through one or more transmission channels according to lines; and
while a reception controller records in one line buffer among one or more line buffers (LBs), reading the stored image data in another line buffer among the one or more LBs with a speed corresponding to a total bandwidth obtained by summing bandwidths of the respective one or more transmission channels, and sequentially recording the image data in a pixel buffer including several line memories connected to a frame store.

* * * * *